US011438652B2

(12) United States Patent
Nezu

(10) Patent No.: US 11,438,652 B2
(45) Date of Patent: Sep. 6, 2022

(54) DISPLAY SYSTEM, DISPLAY METHOD, AND PROGRAM

(71) Applicant: Sharp NEC Display Solutions, Ltd., Tokyo (JP)

(72) Inventor: Eifu Nezu, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 17/355,775

(22) Filed: Jun. 23, 2021

(65) Prior Publication Data

US 2021/0321161 A1    Oct. 14, 2021

Related U.S. Application Data

(63) Continuation of application No. PCT/JP2018/048039, filed on Dec. 27, 2018.

(51) Int. Cl.
*H04N 21/442*    (2011.01)
*G06F 3/14*    (2006.01)
(Continued)

(52) U.S. Cl.
CPC ..... *H04N 21/44218* (2013.01); *G06F 3/1423* (2013.01); *G06V 40/166* (2022.01);
(Continued)

(58) Field of Classification Search
CPC ......... H04N 21/44218; H04N 21/4223; H04N 21/458; H04N 21/436; H04N 21/4122
See application file for complete search history.

(56) References Cited

U.S. PATENT DOCUMENTS 9,100,694 B1\* 8/2015 Chandel ............... H04N 21/485
9,485,450 B2\* 11/2016 Yamaji ............... H04N 21/4316
(Continued)

FOREIGN PATENT DOCUMENTS

JP    2007-265125 A    10/2007
JP    2011-223169 A    11/2011
(Continued)

OTHER PUBLICATIONS

International Search Report (ISR) (PCT Form PCT/ISA/210), in PCT/JP2018/048039, dated Mar. 26, 2019.

*Primary Examiner* — Jefferey F Harold
*Assistant Examiner* — Timothy R Newlin
(74) *Attorney, Agent, or Firm* — McGinn IP Law Group, PLLC

(57) ABSTRACT

A display system includes a main display unit configured to display a video; a plurality of subordinate display units configured to display a plurality of videos, respectively; a detection unit configured to detect the number of viewers of the main display unit and the respective numbers of viewers of the plurality of subordinate display units; and a control unit. The control unit is configured to switch a video displayed on a subordinate display unit of the plurality of subordinate display units to the same video as a video displayed on the main display unit when the number of viewers of the main display unit detected by the detection unit is equal to or more than a first predetermined value and the number of viewers of the subordinate display unit is less than a second predetermined value.

19 Claims, 3 Drawing Sheets

(51) Int. Cl.
*H04N 21/4223* (2011.01)
*H04N 21/436* (2011.01)
*H04N 21/458* (2011.01)
*G06V 40/19* (2022.01)
*G06V 40/16* (2022.01)

(52) U.S. Cl.
CPC ......... *G06V 40/19* (2022.01); *H04N 21/4223* (2013.01); *H04N 21/436* (2013.01); *H04N 21/458* (2013.01)

(56) References Cited

U.S. PATENT DOCUMENTS

| | | | | |
|---|---|---|---|---|
| 10,855,946 | B2* | 12/2020 | Okajima | H04N 21/4316 |
| 11,064,190 | B2* | 7/2021 | Bathiche | H04N 13/356 |
| 2008/0068285 | A1* | 3/2008 | Kondo | H04N 21/44218 |
| | | | | 345/169 |
| 2013/0194401 | A1* | 8/2013 | Bernard | H04N 13/356 |
| | | | | 359/464 |
| 2014/0055349 | A1* | 2/2014 | Itoh | G06F 3/005 |
| | | | | 345/156 |
| 2014/0315489 | A1* | 10/2014 | Lee | H04M 1/72412 |
| | | | | 455/41.2 |
| 2014/0380201 | A1* | 12/2014 | Massand | G06F 3/1423 |
| | | | | 715/761 |
| 2015/0139612 | A1* | 5/2015 | Lian | H04N 21/4408 |
| | | | | 386/259 |
| 2015/0293740 | A1* | 10/2015 | Cho | H04N 21/42215 |
| | | | | 345/1.2 |
| 2016/0163018 | A1* | 6/2016 | Wang | G06F 3/1423 |
| | | | | 345/504 |
| 2017/0026478 | A1* | 1/2017 | Abbate | H04L 41/0806 |
| 2018/0007431 | A1* | 1/2018 | Sidhu | H04N 21/44008 |
| 2018/0275943 | A1* | 9/2018 | Ono | G09G 5/14 |
| 2018/0357981 | A1* | 12/2018 | Ng | G06Q 30/0269 |
| 2019/0333469 | A1* | 10/2019 | Chen | G06F 3/0482 |
| 2020/0413136 | A1* | 12/2020 | Kunduru | H04N 21/44204 |
| 2021/0112226 | A1* | 4/2021 | Abou Shousha | A61B 3/145 |
| 2021/0385518 | A1* | 12/2021 | Sinnott | H04N 21/4532 |

FOREIGN PATENT DOCUMENTS

| | | |
|---|---|---|
| JP | 2012-015917 A | 1/2012 |
| JP | 2012-134836 A | 7/2012 |
| JP | 2018-025734 A | 2/2018 |

* cited by examiner

DISPLAY SYSTEM, DISPLAY METHOD, AND PROGRAM

TECHNICAL FIELD

The present invention relates to a display system, a display method, and a program.

BACKGROUND ART

A technology is known in which the display content of video content is determined on the basis of factors such as history and a behavior of a user and displayed on a display unit (refer to, for example, Patent Literature 1 and Patent Literature 2). According to a system described in Patent Literature 1, the behavior of a child or animal near a TV receiver can be detected, and video content that attracts the attention of the child or animal can be selected and displayed on the TV receiver. According to the system described in Patent Literature 2, it is possible to infer content that a group of viewers currently viewing want to view from viewing history of the viewers.

CITATION LIST

Patent Literature

[Patent Literature 1]
Japanese Unexamined Patent Application, First Publication No. 2011-223169
[Patent Literature 2]
Japanese Unexamined Patent Application, First Publication No. 2012-015917

SUMMARY OF INVENTION

Technical Problem

In a system including a large main monitor and a plurality of sub-monitors, if a relevant technology is applied, the main monitor displays display content that reflects a preference of the viewers of the main monitor, and each sub-monitor displays display content that reflects a preference of the viewers of each sub-monitor. It is desirable that the main monitor and sub-monitor display the display content that is popular with the viewers and, at the same time, display various video content to give the viewers an opportunity to watch much video content, but if the relevant technology is applied, there are few opportunities to give viewers a variety of video content.

The present invention has been made in consideration of such circumstances, and an object thereof is to provide a display system, a display method, and a program that can change video content displayed on a sub-monitor according to a viewing status of a main monitor in an environment in which the main monitor and the sub-monitor are installed.

Solution to Problem

To solve the problems described above, an aspect of the present invention is a display system that includes a main display unit configured to display a video; a plurality of subordinate display units configured to display a plurality of videos, respectively; a detection unit configured to detect the number of viewers of the main display unit and the respective numbers of viewers of the plurality of subordinate display units; and a control unit configured to switch a video displayed on a subordinate display unit of the plurality of subordinate display units to the same video as a video displayed on the main display unit when the number of viewers of the main display unit detected by the detection unit is equal to or more than a first predetermined value and the number of viewers of the subordinate display unit is less than a second predetermined value.

In addition, another aspect of the present invention is a display method that includes, by a computer, displaying a video on a main display unit; displaying a plurality of videos on a plurality of subordinate display units, respectively; detecting the number of viewers of the main display unit and the respective numbers of viewers of the plurality of subordinate display units; and switching a video displayed on a subordinate display unit of the plurality of subordinate display units to the same video as a video displayed on the main display unit when the detected number of viewers of the main display unit is equal to or more than a first predetermined value and the number of viewers of the subordinate display unit is less than a second predetermined value.

Moreover, still another aspect of the present invention is a non-transitory computer readable storage medium that stores a program which causes a computer to execute: displaying a video on a main display unit; displaying a plurality of videos on a plurality of subordinate display units, respectively; detecting the number of viewers of the main display unit and the respective numbers of viewers of the plurality of subordinate display units; and switching a video displayed on a subordinate display unit of the plurality of subordinate display units to the same video as a video displayed on the main display unit when the detected number of viewers of the main display unit is equal to or more than a first predetermined value and the number of viewers of the subordinate display unit is less than a second predetermined value.

Furthermore, still another aspect of the present invention is a display system that includes a main display unit configured to display a video; a plurality of subordinate display units configured to display a plurality of videos, respectively; a detection unit configured to detect the number of viewers of the main display unit and the respective numbers of viewers of the plurality of subordinate display units; and a control unit configured to switch a video displayed on a subordinate display unit of the plurality of subordinate display units to a video different from a video displayed on another subordinate display unit of the plurality of subordinate display units when the number of viewers of the main display unit detected by the detection unit is less than a first predetermined value and the number of viewers of the subordinate display unit is less than a second predetermined value.

Advantageous Effects of Invention

According to the present invention, it is possible to change video content displayed on a sub-monitor according to a viewing status of a main monitor in an environment in which the main monitor and the sub-monitor are installed.

DESCRIPTION OF EMBODIMENTS

Figure 1:
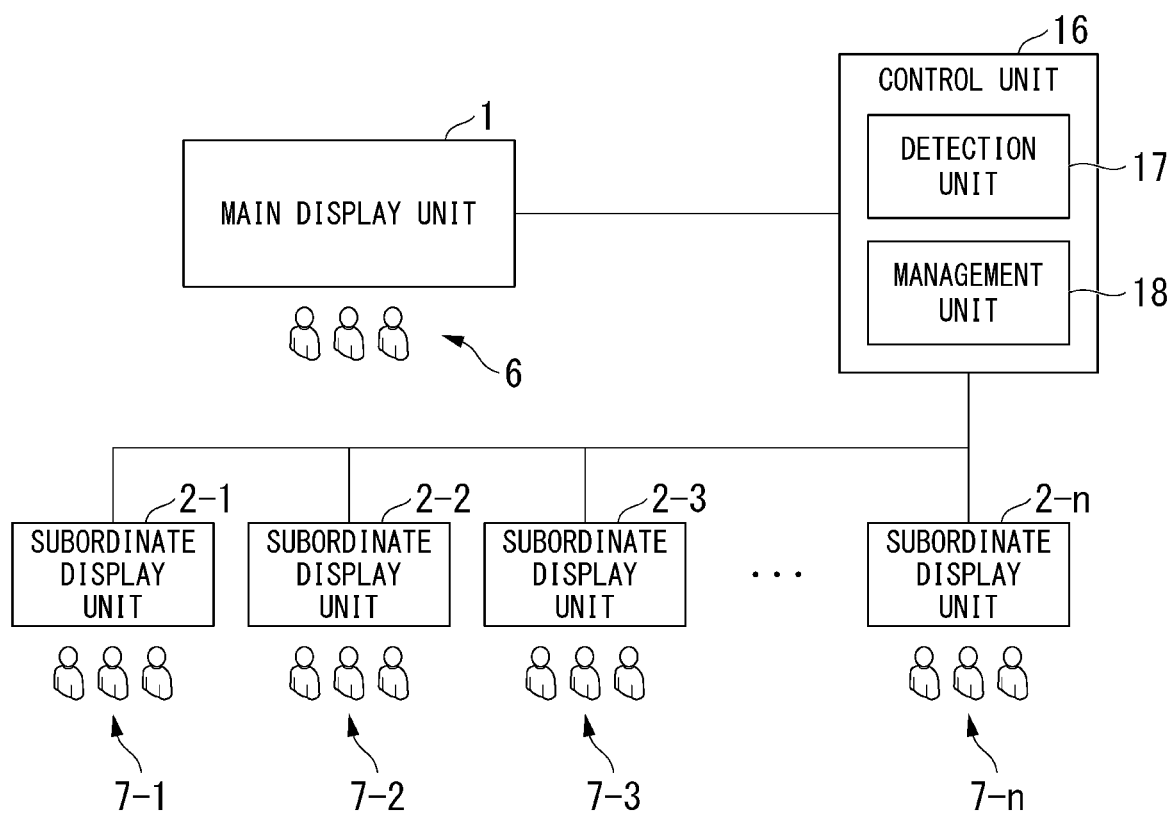
FIG. 1 is a block diagram which shows a configuration of a display system 100.

Hereinafter, a display system according to an embodiment of the present invention will be described with reference to the drawings. FIG. 1 is a block diagram which shows a configuration of a display system 100. The display system 100 includes a main display unit 1, a plurality of subordinate display units 2-$n$ (n is an arbitrary natural number), a control unit 16, a detection unit 17, and a management unit 18. The main display unit 1 displays a display target. The plurality of subordinate display units 2-$n$ each display a plurality of display targets. The display target is, for example, content of a video. The display target may be other content such as a still image or text. A "video" described below is assumed to include this other content.

The detection unit 17 detects the number of viewers 6 of the main display unit 1, and detects the number of viewers 7-$n$ of each of the plurality of subordinate display units 2-$n$. The management unit 18 manages display content of the main display unit 1 and each of the plurality of subordinate display units 2-$n$. The control unit 16 determines the display content of each of the plurality of subordinate display units 2-$n$ on the basis of the number of the viewers 6 and 7-$n$ detected by the detection unit 17 by acquiring predetermined information from the management unit 18, and causes the plurality of subordinate display units 2-$n$ to display the determined display content.

Figure 2:
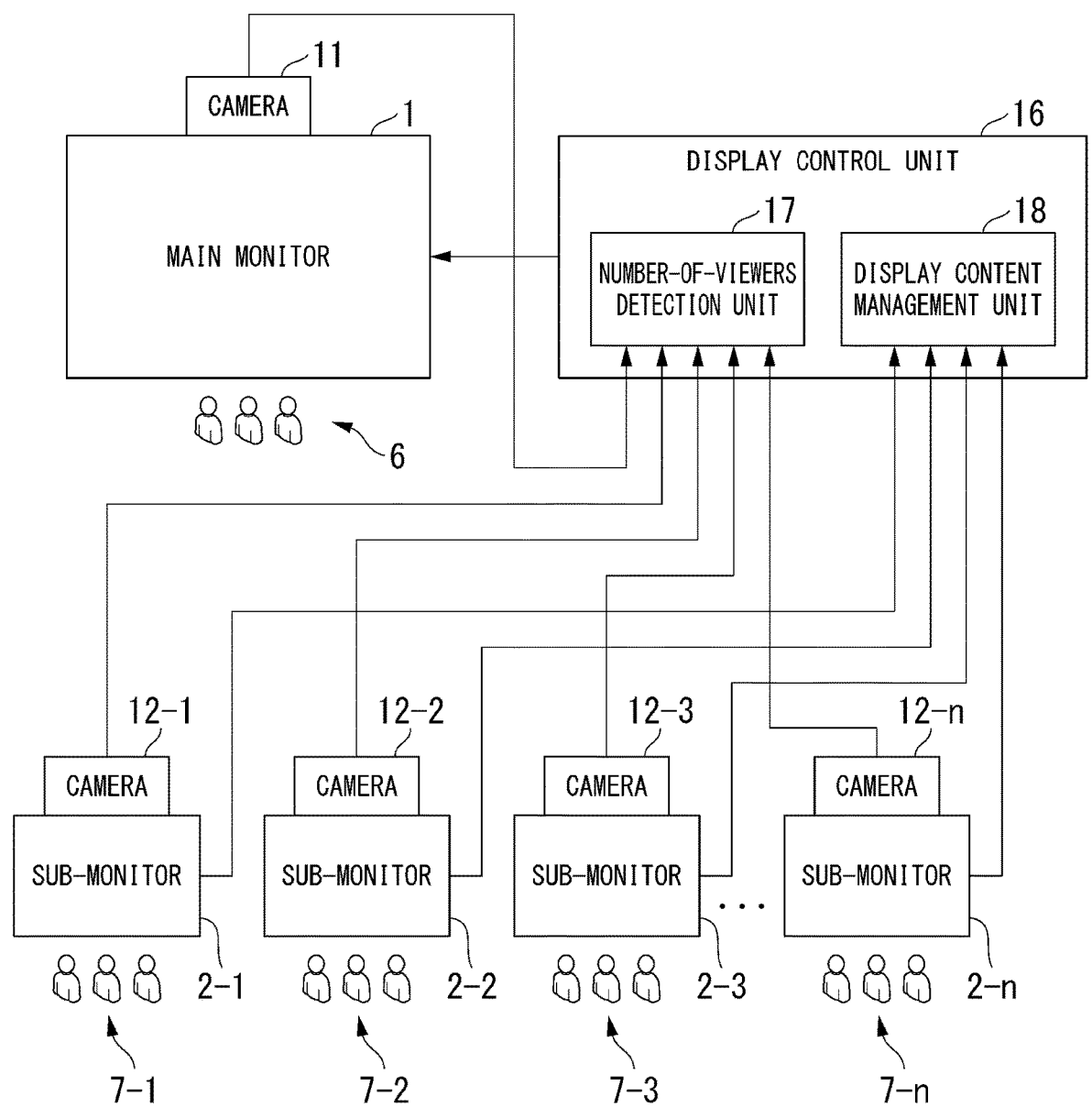
FIG. 2 is a block diagram which shows a detailed configuration of the display system 100.

Next, a detailed configuration of the display system 100 of the embodiment will be described. FIG. 2 is a block diagram which shows the detailed configuration of the display system 100. The display system 100 includes a main monitor 1 (a main display unit), a plurality of sub-monitors 2-$n$ (subordinate display units), a display control unit 16 (a control unit), a number-of-viewers detection unit 17 (a detection unit), and a display content management unit 18 (a management unit).

The main monitor 1 is, for example, a large display device that displays a display target such as video content. As the main monitor 1, for example, a display device such as a liquid crystal display, a light emitting diode (LED) display, or an organic electro-luminescence (organic EL) display is used. The main monitor 1 may be one projected by a projector.

The main monitor 1 is provided with a camera 11 (a first imaging unit) for detecting the number of viewers who view the display content displayed on the main monitor 1. The camera 11 may be provided inside a housing of the main monitor 1, or may be externally provided outside the housing of the main monitor 1. The camera 11 is, for example, a digital camera including an image sensor such as a charge-coupled device (CCD) or a complementary MOS (CMOS).

The sub-monitor 2-$n$ is, for example, a display device smaller than the main monitor 1 that displays a display target such as video content. As the sub-monitor 2-$n$, for example, a display device such as a liquid crystal display, an LED display, or an organic EL display is used. The sub-monitor 2-$n$ may be projected by a projector.

The sub-monitor 2-$n$ is provided with a camera 12-$n$ (a second imaging unit) for detecting the number of viewers 7-$n$ who view the display content displayed on the sub-monitor 2-$n$. The camera 12-$n$ may be provided inside the housing of the sub-monitor 2-$n$, or may be externally provided outside the housing of the sub-monitor 2-$n$.

The display control unit 16 controls the display content displayed on the main monitor 1 and the plurality of sub-monitors 2-$n$. The display control unit 16 includes, for example, a number-of-viewers detection unit 17 and a display content management unit 18. Although the number-of-viewers detection unit 17 and the display content management unit 18 are described as individual functional units in the display control unit 16, each functional unit may be configured as a separate functional unit or may be configured as a single functional unit.

The display control unit 16 causes the main monitor 1 to display the display target. The display control unit 16 causes the plurality of sub-monitors 2-$n$ to display the display target. The display control unit 16 causes, for example, the plurality of sub-monitors 2-$n$ to display different display targets.

The number-of-viewers detection unit 17 detects the number of viewers of the main monitor 1 on the basis of an image captured by the camera 11. The number-of-viewers detection unit 17 detects the number of viewers of the sub-monitor 2-$n$ on the basis of the image captured by the camera 12-$n$. The camera 12-$n$ is, for example, a digital camera including an imaging sensor such as a CCD or a CMOS.

The display content management unit 18 sets, for example, a channel for causing the main monitor 1 and the plurality of sub-monitors 2-$n$ to display the video content delivered from the plurality of channels. The display content management unit 18 manages a plurality of pieces of channel information in association with the main monitor 1 and the plurality of sub-monitors 2-$n$.

The display content management unit 18 manages channel information of the display content displayed on the main monitor 1. The display content management unit 18 manages channel information of the display content displayed on the sub-monitor 2-$n$. The display content management unit 18 changes the channel information when display content to be displayed on the main monitor 1 and the plurality of sub-monitors 2-$n$ is changed.

The display content management unit 18 assigns individual pieces of channel information set by default to the main monitor 1 and the plurality of sub-monitors 2-$n$. When a predetermined condition to be described below is satisfied, the display content management unit 18 switches the channel information of a sub-monitor 2-$n$ to be changed among the plurality of sub-monitors 2-$n$ in response to an instruction from the display control unit 16.

The display content management unit 18 sets the channel information set by default or the channel information that has delivered last video content to be displayed as an initial value when display is newly started. The video content is delivered by, for example, television broadcasting. In addition, the video content may be delivered via a network or may be content obtained by reproducing content stored in a storage device.

Each component of display control unit 16, the number-of-viewers detection unit 17, and the display content management unit 18 is realized by, for example, a hardware processor such as a central processing unit (CPU) executing a program (software). Some or all of these components may be realized by hardware (a circuit unit; including circuitry) such as large scale integration (LSI), an application specific integrated circuit (ASIC), a field-programmable gate array (FPGA), or a graphics processing unit (GPU), and may be realized by software and hardware in cooperation. The program may be stored in advance in a storage device such as a hard disk drive (HDD) or a flash memory, or may be stored in a detachable storage medium such as a DVD or CD-ROM and installed by the storage medium being mounted in a drive device. In addition, this computer program may be delivered to a computer via a communication line, and the computer receiving this delivery may execute the program.

[Operation]

Next, an operation of the display system 100 will be described. The display control unit 16 displays display content on the main monitor 1 on the basis of information of a display target managed by the display content management unit 18. In the main monitor 1, the camera 11 captures an image of viewers 6 who are viewing the display target displayed on a display surface of the main monitor 1. The camera 11 outputs the captured image of the viewers 6 to the number-of-viewers detection unit 17 at a predetermined timing. The predetermined timing is, for example, every predetermined time. However, the predetermined timing may be set to any timing as long as an image of viewers for ascertaining the number of viewers can be captured. At this time, the camera 11 outputs information on a date and time of capturing the image to the number-of-viewers detection unit 17 at the same time.

The display control unit 16 selects a plurality of pieces of display content delivered from a plurality of channels and causes the main monitor 1 and each of the plurality of sub-monitors 2-n to display them on the basis of, for example, the channel information of a display target managed by the display content management unit 18. In each sub-monitor 2-n, a camera 12-n captures an image of viewers 7-n who are viewing a display target displayed on a display surface of the sub-monitor 2-n. The camera 12-n outputs the captured image of the viewers 7-n to the number-of-viewers detection unit 17 at a predetermined timing. At this time, the camera 12-n outputs information on a date and time of capturing the image to the number-of-viewers detection unit 17 at the same time.

The number-of-viewers detection unit 17 analyzes the image captured by the camera 11, performs face recognition processing of a person, and detects the number of viewers of the main monitor 1. The number-of-viewers detection unit 17 recognizes a face of a person by using a position of each feature point extracted from a captured image of the face, a distance between the feature points, and the like. The number-of-viewers detection unit 17 detects the number of viewers in the captured image on the basis of the recognized face.

The number-of-viewers detection unit 17 may detect the number of viewers on the basis of processing of detecting a pupil in the face of a person. The number-of-viewers detection unit 17 recognizes the pupil of a person in a captured image on the basis of, for example, brightness of the image. The number-of-viewers detection unit 17 detects the pupil of a person on the basis of, for example, the captured image. The number-of-viewers detection unit 17 recognizes the pupil in the face of a person by using, for example, the position of each feature point extracted from the captured image including a face, the distance between the feature points, and the like.

The number-of-viewers detection unit 17 detects the number of viewers on the basis of the detected pupil. Similarly, the number-of-viewers detection unit 17 analyzes an image captured by the camera 12-n, performs face recognition processing and pupil detection processing of a person, and detects the number of viewers of each sub-monitor 2-n. The number-of-viewers detection unit 17 outputs the detected number of viewers of the main monitor 1 and number of viewers of each sub-monitor 2-n to the display control unit 16.

The display control unit 16 compares the number of viewers of the main monitor 1 and each sub-monitor 2-n detected by the number-of-viewers detection unit 17 with a predetermined value. The display control unit 16 determines whether the number of viewers of the main monitor 1 is less than the predetermined value. In addition, the display control unit 16 determines whether the number of viewers of each sub-monitor 2-n is less than the predetermined value. The predetermined value is a value set in advance by assuming that the number of viewers is small. The predetermined value may be a constant value with respect to the main monitor 1 and each sub-monitor 2-n, or may be set individually.

The display control unit 16 extracts a sub-monitor 2-n which has the number of viewers less than the predetermined value when the number of viewers of the main monitor 1 is equal to or more than the predetermined value. The display control unit 16 acquires channel information of video content (first display content) displayed on the main monitor 1 from the display content management unit 18. The display control unit 16 instructs the display content management unit 18 to switch channel information of the extracted sub-monitor 2-n to channel information corresponding to the first display content on the basis of the channel information acquired from the display content management unit 18, and to display the first display content on the extracted sub-monitor 2-n.

With such processing, the sub-monitor 2-n, which is determined to have a small number of viewers, displays display content such as video content of the main monitor 1 of which the number of viewers is guaranteed to be equal to or more than a predetermined value, and thus the preference of the viewers is reflected.

In addition, the display control unit 16 extracts a sub-monitor 2-n of which the number of viewers is equal to or more than a predetermined value when the number of viewers of the main monitor 1 is equal to or more than the predetermined value. In this case, the display control unit 16 causes the sub-monitor 2-n of which the number of viewers is equal to or more than the predetermined value to maintain and display content that is being displayed.

With such processing, the sub-monitor 2-n of which the number of viewers is guaranteed to be equal to or more than a predetermined value and which displays popular display content continuously displays the display content that is being displayed, and thus the preference of the viewers is reflected.

When the number of viewers of the main monitor 1 is less than the predetermined value, the display control unit 16 extracts a sub-monitor 2-n of which a number of viewers is less than the predetermined value. The display control unit 16 acquires the channel information of video content different from the channel information of video content being displayed on another sub-monitor 2-n from the display content management unit 18.

The display control unit 16 instructs the display content management unit 18 to change the channel information of the extracted sub-monitor 2-n of which the number of viewers is less than the predetermined value to the channel information acquired from the display content management unit 18, and causes the sub-monitor 2-n of which the number of viewers is less than the predetermined value to display content of video content that is different from the video content being displayed on another sub-monitor 2-n.

In addition, the display control unit 16 may also cause the main monitor 1 which is determined to have a small number of viewers to display the display content of the video content different from the video content being displayed on another sub-monitor 2-n.

With such processing, a sub-monitor 2-n which is determined to have a small number of viewers and displays unpopular display content displays display content different from video content of another sub-monitor 2-n of which the number of viewers is guaranteed to be equal to or more than a predetermined value, and it is possible to give viewers an opportunity to watch more video content.

When the number of viewers of the main monitor 1 is less than the predetermined value, the display control unit 16 extracts a sub-monitor 2-n of which the number of viewers is equal to or more than the predetermined value. The display control unit 16 causes the sub-monitor 2-n of which the number of viewers is equal to or more than the predetermined value to maintain and display content which is being displayed.

With such processing, the sub-monitor 2-n of which the number of viewers is guaranteed to be equal to or more than the predetermined value and which displays popular display content continuously displays the display content which is being displayed, and thus the preference of the viewers is reflected.

Figure 3:
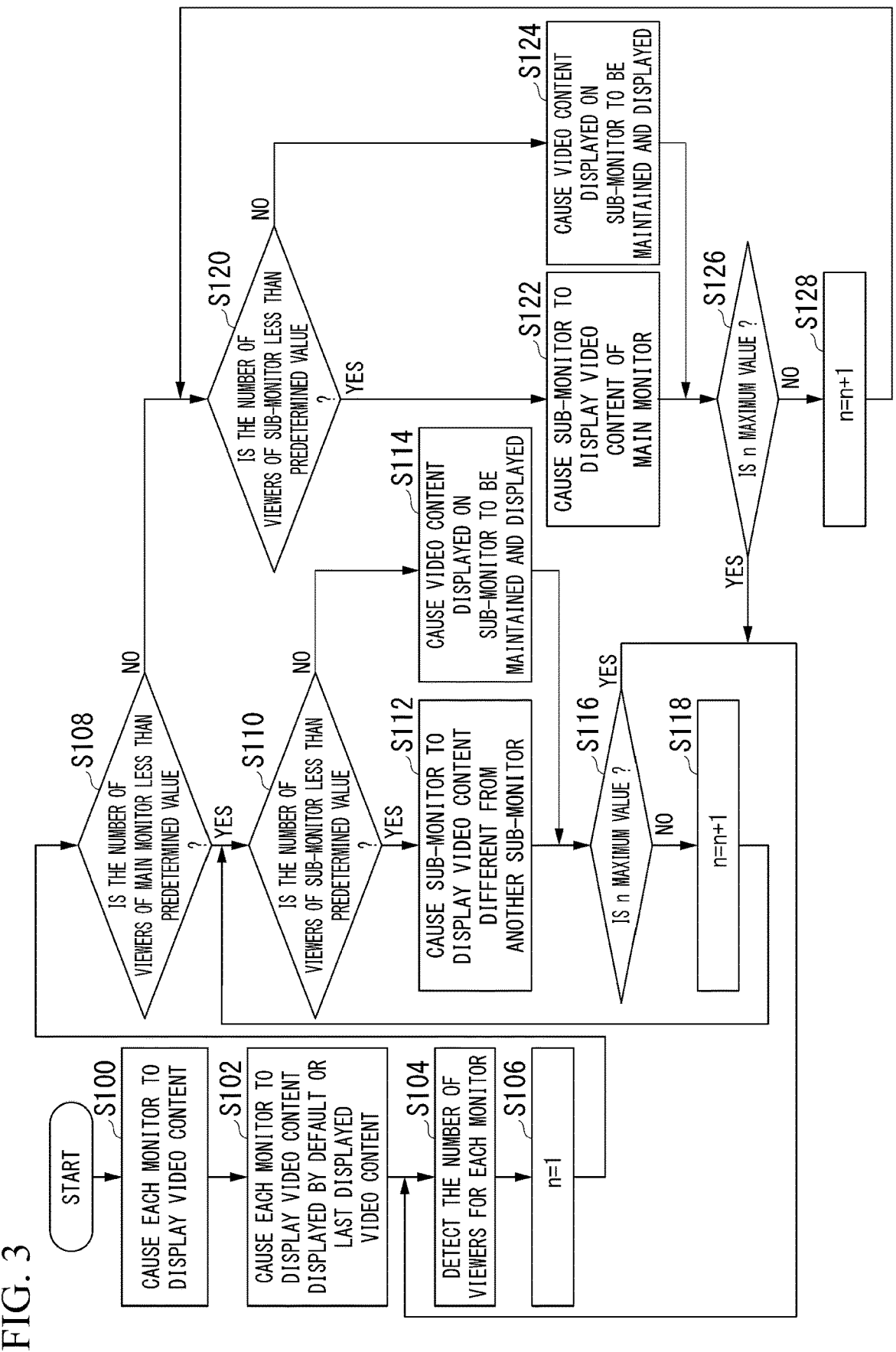
FIG. 3 is a flowchart which shows an example of a flow of processing executed in the display system 100.

Next, a flow of processing executed in the display system 100 will be described. FIG. 3 is a flowchart which shows an example of the flow of processing executed in the display system 100.

First, processing of displaying video content is started after power is turned on in the display system 100. The display control unit 16 causes the main monitor 1 and the plurality of sub-monitors 2-n to display the video content on the basis of the channel information acquired from the display content management unit 18 (step S100).

The display control unit 16 causes the main monitor 1 and the plurality of sub-monitors 2-n to display video content displayed by default or displayed last on the basis of the channel information (step S102). The number-of-viewers detection unit 17 detects the number of viewers in the main monitor 1 and the plurality of sub-monitors 2-n (step S104).

The display control unit 16 sets n in a sub-monitor 2-n to be detected as 1 (step S106). The display control unit 16 determines whether the number of viewers of the main monitor 1 is less than a predetermined value (step S108). When the number of viewers of the main monitor 1 is less than the predetermined value in step S108 (Yes in step S108), the display control unit 16 determines whether the number of viewers of the sub-monitor 2-n is less than the predetermined value (step S110).

When the number of viewers of the sub-monitor 2-n is less than the predetermined value in step S110 (Yes in step S110), the display control unit 16 causes the sub-monitor 2-n to display video content different from that of another sub-monitor 2-n (step S112). When the number of viewers of the sub-monitor 2-n is equal to or more than the predetermined value in step S110 (No in step S110), the display control unit 16 causes the video content which is displayed on the sub-monitor 2-n to be maintained and displayed (step S114).

Next, the display control unit 16 determines whether n is a maximum value (step S116). When n is not the maximum value in step S116 (No in step S116), the display control unit 16 changes n to n+1 (step S118) and returns the processing to step S110. When the number of viewers of all the sub-monitors 2-n has been determined and n is the maximum value in step S116 (Yes in step S116), the display control unit 16 returns the processing to step S104.

When the number of viewers of the main monitor 1 is equal to or more than the predetermined value in step S108 (No in step S108), the display control unit 16 determines whether the number of viewers of the sub-monitor 2-n is less than the predetermined value (step S120). When the number of viewers of the sub-monitor 2-n is less than the predetermined value in step S120 (Yes in step S120), the display control unit 16 causes the sub-monitor 2-n to display the video content that is being displayed on the main monitor 1 (step S122).

When the number of viewers of the sub-monitor 2-n is equal to or more than the predetermined value in step S120 (No in step S120), the display control unit 16 causes the video content displayed on the sub-monitor 2-n to be maintained and displayed (step S124). Next, the display control unit 16 determines whether n is the maximum value (step S126).

If n is not the maximum value in step S126 (No in step S126), the display control unit 16 changes n to n+1 (step S128) and returns the processing to step S110. When the numbers of viewers of all the sub-monitors 2-n have been determined, and n is the maximum value in step S126 (Yes in step S126), the display control unit 16 returns the processing to step S120.

The flowchart described above is executed, for example, until the power of the display system 100 is turned off. In addition, a timing of returning the processing to step S104 in step S116 and step S126 may be after the elapse of a predetermined time, or may be any timing.

A program for realizing a function of the display system 100 in FIG. 1 may be recorded on a computer-readable recording medium, and the program recorded on this recording medium may be read into a computer system and executed to perform processing of causing the main monitor to display a video content with the largest number of viewers. The term "computer system" herein is assumed to include an OS and hardware such as peripheral devices. In addition, the "computer system" is also assumed to include a WWW system provided with a homepage providing environment (or a display environment). Moreover, the "computer-readable recording medium" refers to a portable medium such as a flexible disk, a magneto-optical disc, a ROM, or a CD-ROM, or a storage device such as a hard disk embedded in the computer system. Furthermore, the "computer-readable recording medium" is assumed to include a unit that holds a program for a certain period of time, such as a volatile memory (RAM) inside the computer system that serves as a server or client when a program is transmitted via a network such as the Internet or a communication line such as a telephone line.

In addition, the program described above may be transmitted from the computer system in which this program is stored in a storage device or the like to another computer system via a transmission medium or by a transmission wave in the transmission medium. Here, the "transmission medium" for transmitting the program refers to a medium having a function of transmitting information, like a network (a communication network) such as the Internet or a communication line (communication line) such as a telephone line. Moreover, the program described above may be a program for realizing a part of the functions described above. Furthermore, the program may also be a so-called difference file (a difference program) that can realize the functions described above in combination with a program already recorded in the computer system.

According to the display system 100 of the embodiment described above, a video content displayed on the main monitor 1 can be viewed on each sub-monitor 2-*n* when the number of viewers of the main monitor 1 is large, and, conversely, more types of video contents are displayed on each sub-monitor 2-*n* when the number of viewers of the main monitor 1 is small, thereby it is possible to give viewers an opportunity to watch more contents.

The present invention is not limited to the embodiment described above, and modifications, improvements, and the like are included in the present invention within a range in which the object of the present invention can be achieved. For example, according to the embodiment described above, the display system 100 is controlled according to the channel information of a video content displayed on each monitor. In addition, the display system 100 may cause each monitor to display a video content according to a video content input to an input terminal of each monitor in advance. Then, the display system 100 may change display content by switching an input terminal of the main monitor for a video content to be displayed on the main monitor on the basis of information on input terminals displayed by each sub-monitor. Moreover, the display system 100 may use a URL instead of channel information when a video content is delivered via the network.

REFERENCE SIGNS LIST

1 Main monitor
2-*n* Sub-monitor
11 Camera
12-*n* Camera
16 Display control unit
17 Number-of-viewers detection unit
18 Display content management unit
100 Display system

What is claimed is:

1. A display system comprising:
a main display unit configured to display a video;
a plurality of subordinate display units configured to display a plurality of videos, respectively;
a detection unit configured to detect the number of viewers of the main display unit and the respective numbers of viewers of the plurality of subordinate display units; and
a control unit configured to switch a video displayed on a subordinate display unit of the plurality of subordinate display units to the same video as a video displayed on the main display unit when the number of viewers of the main display unit detected by the detection unit is equal to or more than a first predetermined value and the number of viewers of the subordinate display unit is less than a second predetermined value.

2. The display system according to claim 1, wherein the control unit is configured to switch a video displayed on the subordinate display unit to a video different from a video displayed on another subordinate display unit of the plurality of subordinate display units when the number of viewers of the main display unit detected by the detection unit is less than the first predetermined value and the number of viewers of the subordinate display unit is less than the second predetermined value.

3. The display system according to claim 1, wherein the control unit is configured to cause the subordinate display unit to maintain displaying the video when the number of viewers of the main display unit detected by the detection unit is equal to or more than the first predetermined value and the number of viewers of the subordinate display unit is equal to or more than the second predetermined value.

4. The display system according to claim 1, wherein the control unit is configured to cause the subordinate display unit to maintain displaying the video when the number of viewers of the main display unit detected by the detection unit is less than the first predetermined value and the number of viewers of the subordinate display unit is equal to or more than the second predetermined value.

5. The display system according to claim 1, wherein the main display unit includes a first imaging unit configured to capture an image of viewers of the main display unit, and
wherein the detection unit is configured to detect the number of viewers of the main display unit on the basis of the image captured by the first imaging unit.

6. The display system according to claim 5, wherein the subordinate display unit includes a second imaging unit configured to captures an image of viewers of the subordinate display unit, and
wherein the detection unit is configured to detect the number of viewers of the subordinate display unit on the basis of an image captured by the second imaging unit.

7. The display system according to claim 6, wherein the detection unit is configured to analyze an image captured by the first imaging unit or the second imaging unit, executes face recognition processing, and detects the number of viewers of the main display unit or the subordinate display unit.

8. The display system according to claim 7, wherein the detection unit is configured to analyze an image captured by the first imaging unit or the second imaging unit, executes pupil detection processing, and detects the number of viewers of the main display unit or the subordinate display unit.

9. The display system according to claim 1, further comprising:
a management unit configured to manage display content of the main display unit and each of the plurality of subordinate display units,
wherein the management unit acquires first information in which display content displayed on the main display unit is associated with the number of viewers and second information in which display content displayed on the plurality of subordinate display units is associated with the number of viewers on the basis of the number of viewers detected by the detection unit, and
the control unit determines display content to be displayed on each of the plurality of subordinate display units on the basis of the first information and the second information, and causes each of the plurality of subordinate display units to display the display content.

10. A display system comprising:
a main display unit configured to display a video;
a plurality of subordinate display units configured to display a plurality of videos, respectively;
a detection unit configured to detect the number of viewers of the main display unit and the respective numbers of viewers of the plurality of subordinate display units; and
a control unit configured to switch a video displayed on a subordinate display unit of the plurality of subordinate display units to a video different from a video displayed on another subordinate display unit of the plurality of subordinate display units when the number of viewers of the main display unit detected by the detection unit is less than a first predetermined value and the number of viewers of the subordinate display unit is less than a second predetermined value.

11. The display system according to claim 10, wherein the control unit is configured to cause the subordinate display unit to maintain displaying the video when the number of viewers of the main display unit detected by the detection unit is equal to or more than the first predetermined value and the number of viewers of the subordinate display unit is equal to or more than the second predetermined value.

12. The display system according to claim 10, wherein the control unit is configured to cause the subordinate display unit to maintain displaying the video when the number of viewers of the main display unit detected by the detection unit is less than the first predetermined value and the number of viewers of the subordinate display unit is equal to or more than the second predetermined value.

13. The display system according to claim 10, wherein the main display unit includes a first imaging unit configured to capture an image of viewers of the main display unit, and wherein the detection unit is configured to detect the number of viewers of the main display unit on the basis of the image captured by the first imaging unit.

14. The display system according to claim 13, wherein the subordinate display unit includes a second imaging unit configured to captures an image of viewers of the subordinate display unit, and wherein the detection unit is configured to detect the number of viewers of the subordinate display unit on the basis of an image captured by the second imaging unit.

15. The display system according to claim 14, wherein the detection unit is configured to analyze an image captured by the first imaging unit or the second imaging unit, executes face recognition processing, and detects the number of viewers of the main display unit or the subordinate display unit.

16. The display system according to claim 15, wherein the detection unit is configured to analyze an image captured by the first imaging unit or the second imaging unit, executes pupil detection processing, and detects the number of viewers of the main display unit or the subordinate display unit.

17. The display system according to claim 10, further comprising:
a management unit configured to manage display content of the main display unit and each of the plurality of subordinate display units,
wherein the management unit acquires first information in which display content displayed on the main display unit is associated with the number of viewers and second information in which display content displayed on the plurality of subordinate display units is associated with the number of viewers on the basis of the number of viewers detected by the detection unit, and
the control unit determines display content to be displayed on each of the plurality of subordinate display units on the basis of the first information and the second information, and causes each of the plurality of subordinate display units to display the display content.

18. A display method comprising:
displaying a video on a main display unit;
displaying a plurality of videos on a plurality of subordinate display units, respectively;
detecting the number of viewers of the main display unit and the respective numbers of viewers of the plurality of subordinate display units; and
switching a video displayed on a subordinate display unit of the plurality of subordinate display units to the same video as a video displayed on the main display unit when the detected number of viewers of the main display unit is equal to or more than a first predetermined value and the number of viewers of the subordinate display unit is less than a second predetermined value.

19. A non-transitory computer readable storage medium that stores a program which causes a computer, when executed by the computer, to execute
displaying a video on a main display unit;
displaying a plurality of videos on a plurality of subordinate display units, respectively;
detecting the number of viewers of the main display unit and the respective numbers of viewers of the plurality of subordinate display units; and
switching a video displayed on a subordinate display unit of the plurality of subordinate display units to the same video as a video displayed on the main display unit when the detected number of viewers of the main display unit is equal to or more than a first predetermined value and the number of viewers of the subordinate display unit is less than a second predetermined value.

* * * * *